United States Patent
Henderson et al.

(10) Patent No.: US 11,235,405 B2
(45) Date of Patent: Feb. 1, 2022

(54) METHOD OF REPAIRING SUPERALLOY COMPONENTS USING PHASE AGGLOMERATION

(71) Applicant: General Electric Company, Schenectady, NY (US)

(72) Inventors: Brian Leslie Henderson, Simpsonville, SC (US); Paul Albert Cook, Greenville, SC (US); Yan Cui, Greer, SC (US); Daniel James Dorriety, Greenville, SC (US)

(73) Assignee: General Electric Company, Schenectady, NY (US)

( * ) Notice: Subject to any disclaimer, the term of this patent is extended or adjusted under 35 U.S.C. 154(b) by 430 days.

(21) Appl. No.: 16/402,163

(22) Filed: May 2, 2019

(65) Prior Publication Data

US 2020/0346294 A1 Nov. 5, 2020

(51) Int. Cl.
*B23K 1/20* (2006.01)
*C22F 1/10* (2006.01)
*B23K 101/00* (2006.01)
*B23K 103/08* (2006.01)

(52) U.S. Cl.
CPC .............. *B23K 1/20* (2013.01); *C22F 1/10* (2013.01); *B23K 2101/001* (2018.08); *B23K 2103/08* (2018.08)

(58) Field of Classification Search
None
See application file for complete search history.

(56) References Cited

U.S. PATENT DOCUMENTS

| 5,873,703 | A | * | 2/1999 | Kelly | B23P 6/045 416/241 R |
| 6,120,624 | A | * | 9/2000 | Vogt | C22F 1/10 148/516 |
| 6,884,964 | B2 | | 4/2005 | Murphy | |

(Continued)

FOREIGN PATENT DOCUMENTS

CN 111872628 A 11/2020
EP 0969114 A2 1/2000

(Continued)

OTHER PUBLICATIONS

European Search Report and Opinion issued in connection with corresponding EP Application No. 20171636.2, dated Sep. 15, 2020, 8 pages.

(Continued)

*Primary Examiner* — Devang R Patel
(74) *Attorney, Agent, or Firm* — James Pemrick; Hoffman Warnick LLC

(57) ABSTRACT

A method of repairing a superalloy component includes subjecting the superalloy component, including a repair area, to a phase agglomeration cycle, which includes stepped heating and controlled cooling of the component. The method further includes applying weld material to the repair area to create a weld surface; and covering the weld surface with brazing material. The component is then subjected to a braze cycle to produce a brazed component. The brazed component is cleaned, and the cleaned component is subjected to a restorative heat treatment to restore the microcrystalline structure and mechanical properties of the component.

17 Claims, 5 Drawing Sheets

(56) References Cited

U.S. PATENT DOCUMENTS

| | | | |
|---|---|---|---|
| 7,484,651 B2 | 2/2009 | Gandy et al. | |
| 7,653,995 B2 | 2/2010 | Morin | |
| 7,896,986 B2* | 3/2011 | Kottilingam | C22F 1/10 |
| | | | 148/675 |
| 8,640,942 B1 | 2/2014 | Ozbaysal et al. | |
| 9,056,372 B2* | 6/2015 | Miglietti | F01D 5/286 |
| 9,174,314 B2* | 11/2015 | Ozbaysal | B22D 19/10 |
| 2005/0067466 A1* | 3/2005 | Boegli | B23K 26/32 |
| | | | 228/119 |
| 2006/0121183 A1 | 6/2006 | DeBiccari et al. | |
| 2007/0241169 A1* | 10/2007 | Arnett | B23P 6/007 |
| | | | 228/165 |
| 2008/0210347 A1 | 9/2008 | Morin et al. | |
| 2008/0210741 A1* | 9/2008 | Thompson | B23K 26/342 |
| | | | 228/155 |
| 2009/0320966 A1 | 12/2009 | Morin | |
| 2011/0168679 A1* | 7/2011 | Qi | F01D 5/005 |
| | | | 219/75 |
| 2013/0323533 A1* | 12/2013 | Cui | B23K 26/211 |
| | | | 428/680 |
| 2015/0275687 A1 | 10/2015 | Bruck et al. | |
| 2017/0266749 A1* | 9/2017 | Whims | B23K 9/0026 |
| 2018/0257181 A1 | 9/2018 | Goncharov et al. | |
| 2018/0361495 A1* | 12/2018 | Eminoglu | B23P 6/007 |
| 2019/0047094 A1* | 2/2019 | Puidokas | B23K 26/32 |

FOREIGN PATENT DOCUMENTS

| | | |
|---|---|---|
| EP | 2944402 A1 | 11/2015 |
| EP | 3381604 A1 | 10/2018 |
| EP | 3417972 A1 | 12/2018 |
| GB | 1253755 A | 11/1971 |

OTHER PUBLICATIONS

Notice of Publication, related CN application No. 202010277145.1, dated Nov. 9, 2020, 21 pages.

\* cited by examiner

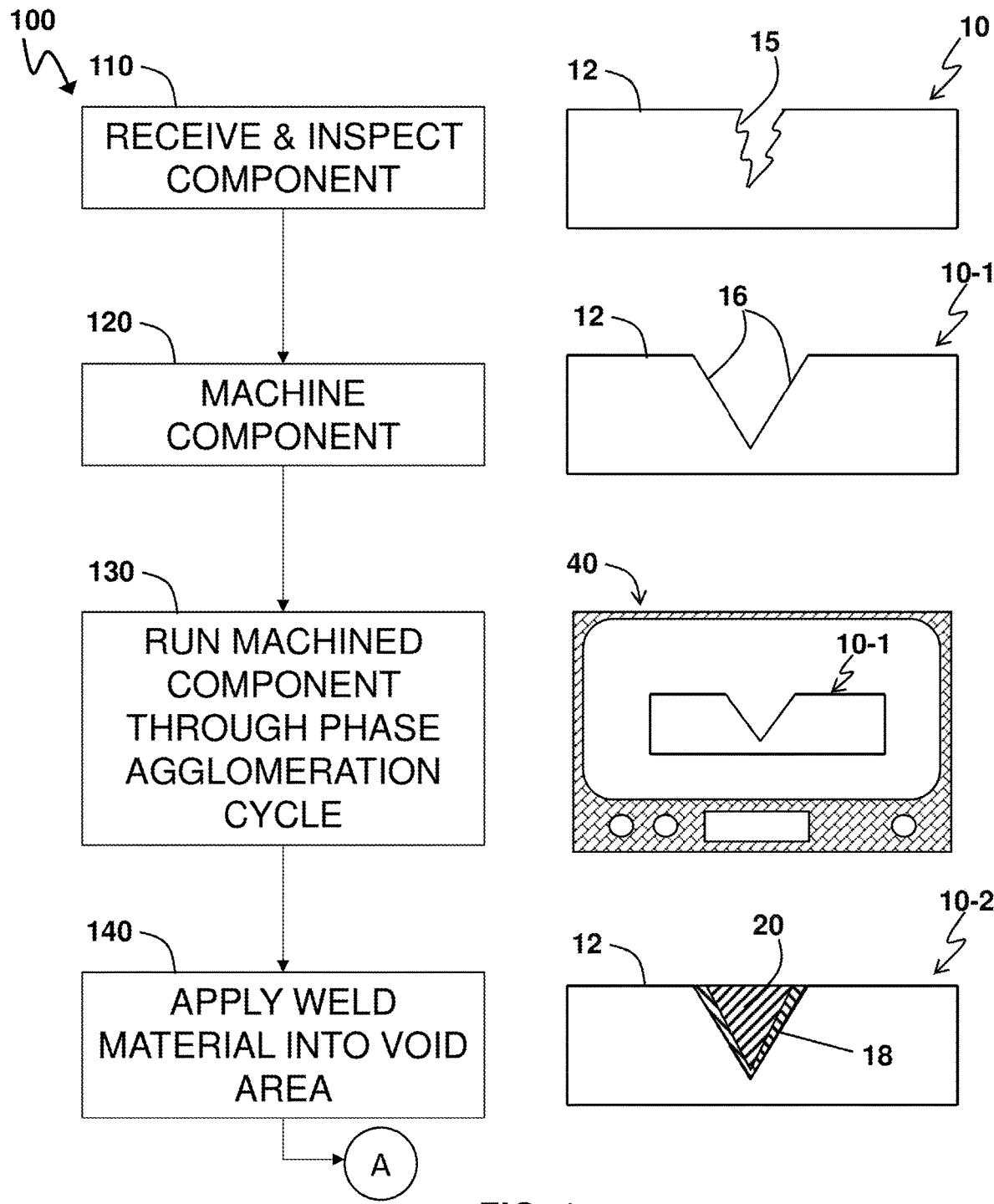
— FIG. 1 —

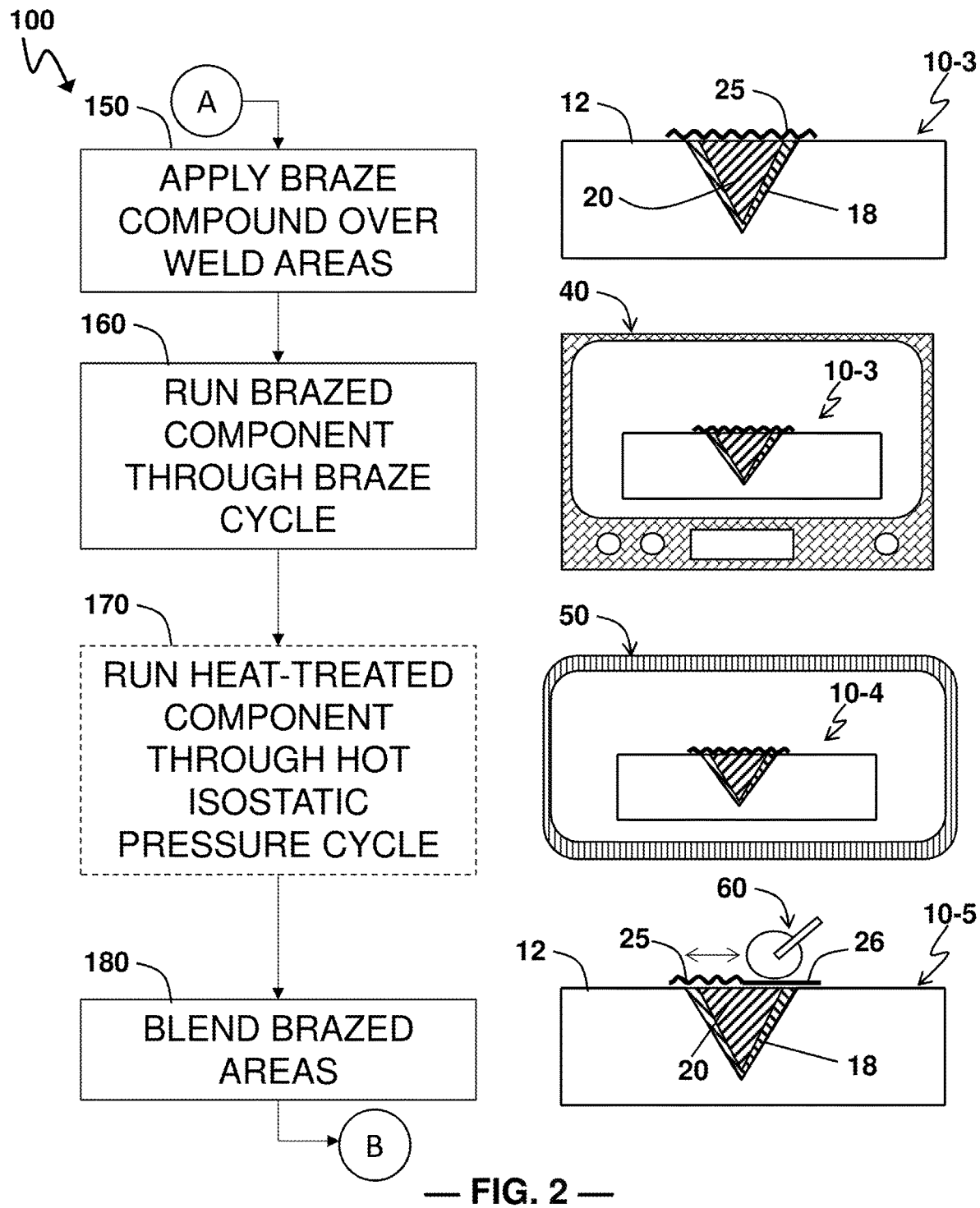
— FIG. 2 —

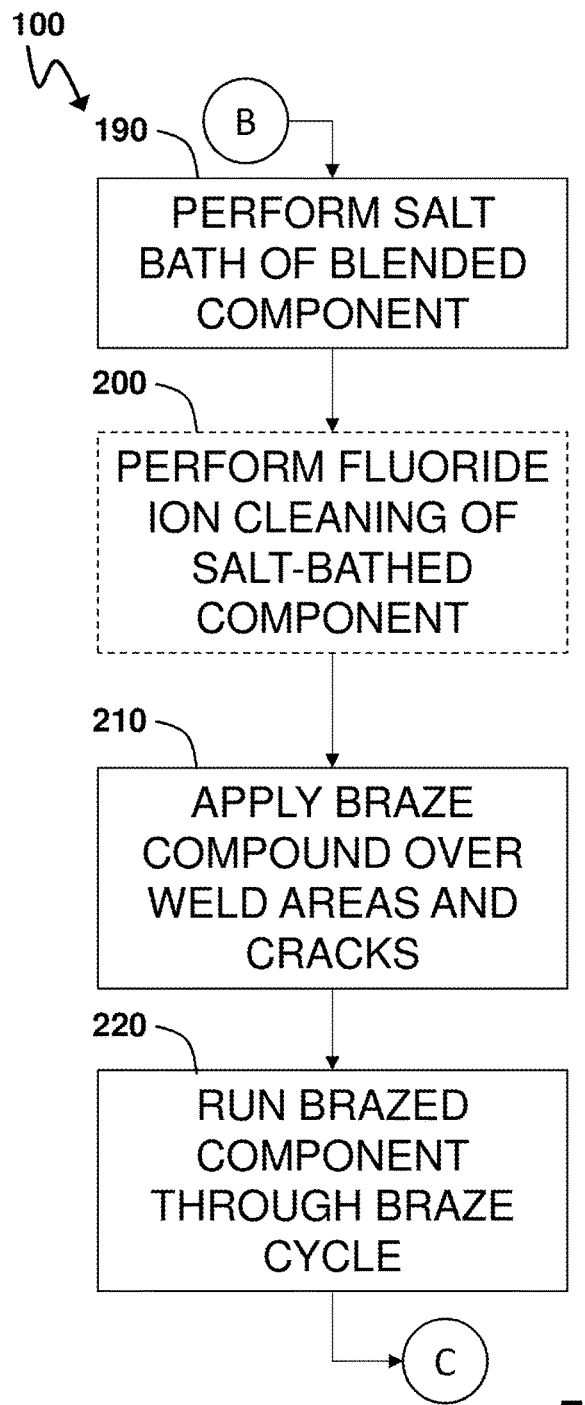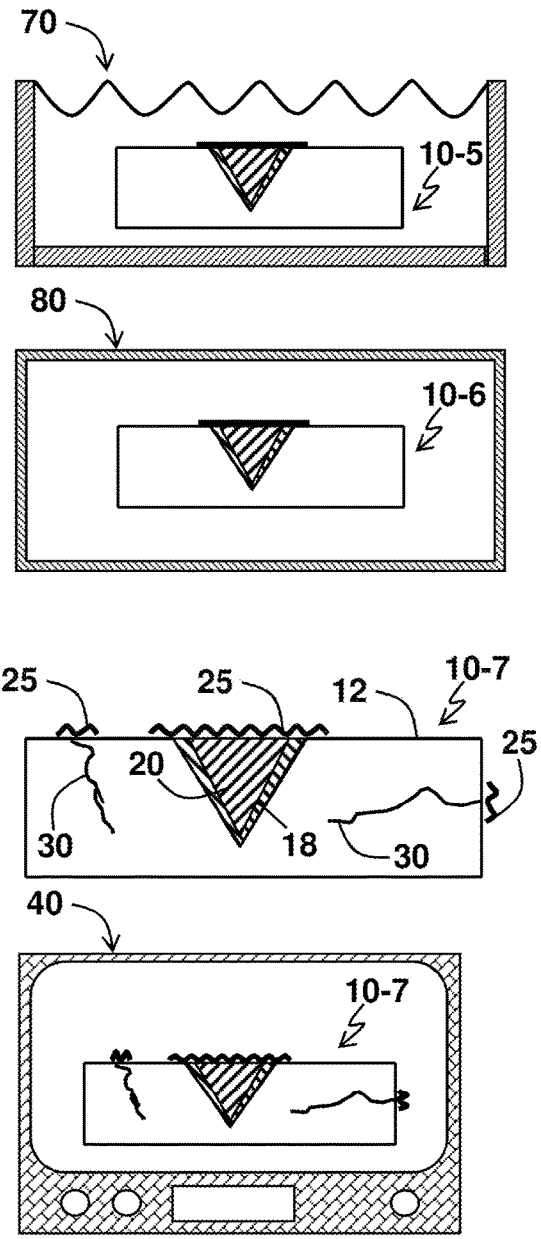
— FIG. 3 —

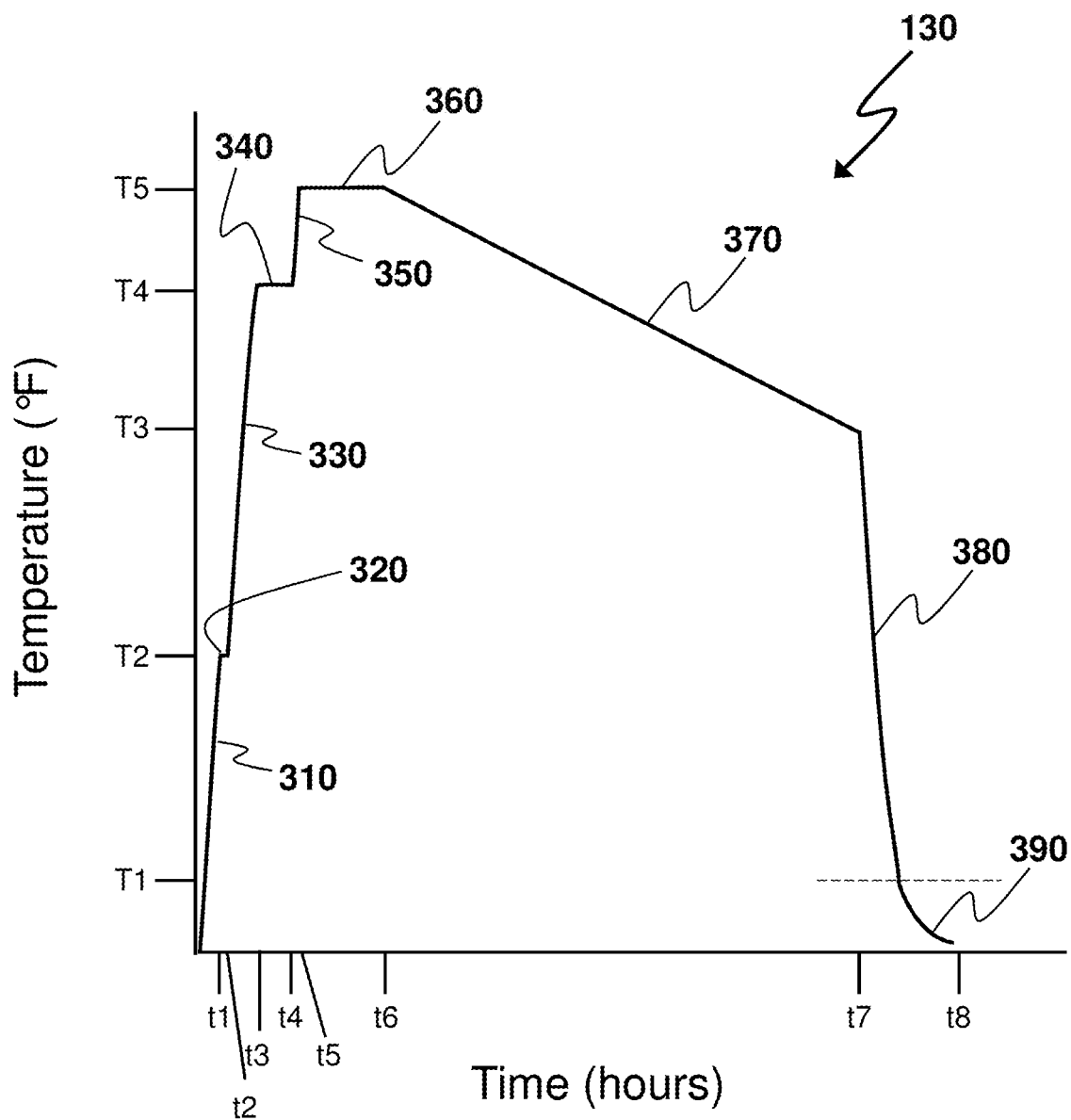
— FIG. 5 —

METHOD OF REPAIRING SUPERALLOY COMPONENTS USING PHASE AGGLOMERATION

TECHNICAL FIELD

This disclosure relates to joining technology generally, and specifically, to a repair or service method for damaged components fabricated of high gamma prime superalloys.

BACKGROUND

Some conventional turbo machines, such as gas turbine systems, are utilized to generate electrical power. In general, gas turbine systems include a compressor, one or more combustor, and a turbine. Air may be drawn into the compressor, via its inlet, where the air is compressed by passing through multiple stages of rotating blades and stationary nozzles. The compressed air is directed to one or more combustors, where fuel is introduced, and a fuel/air mixture is ignited and burned to form combustion products that function as the operational fluid of the turbine.

The operational fluid then flows through a fluid flow path in the turbine, the flow path being defined between a plurality of rotating blades and stationary nozzles disposed between the rotating blades, such that each set of rotating blades and each corresponding set of stationary nozzles collectively define a turbine stage. As the rotating blades rotate the rotor of the gas turbine system, a generator coupled to the rotor may generate electrical power. The rotation of the turbine blades also causes rotation of the compressor blades, which are coupled to the rotor.

Because combustion systems are being designed to operate at increasingly high temperatures to improve efficiency, manufacturers must select materials for the turbine components that are capable of withstanding these high-temperature environments. In many instances, high gamma prime superalloys (such as Rene 108) have been chosen for their excellent mechanical and (low) oxidation properties in the target conditions. Such superalloys may be used in blades, nozzles, and shrouds.

However, Rene 108 and other high gamma prime superalloys have poor weldability and are some of the hardest to weld materials in the superalloy category. Welding high gamma prime superalloys using any traditional welding procedures results in significant cracking in the weld metal and base metal heat-affected zone. Undesirable cracks along the weld line lead to unacceptable welds.

An improved process for welding high gamma prime superalloys (for example, during a repair process) is needed.

SUMMARY

In an aspect of the present disclosure, a method of repairing a superalloy component includes subjecting the superalloy component, including a repair area, to a phase agglomeration cycle, which includes stepped heating and controlled cooling of the component. The method further includes applying weld material to the repair area to create a weld surface; and covering the weld surface with brazing material. The component is then subjected to a braze cycle to produce a brazed component. The brazed component is cleaned, and the cleaned component is subjected to a restorative heat treatment to restore the microcrystalline structure and mechanical properties of the component. The superalloy component is comprised of a high gamma prime superalloy.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which:

FIGS. 1 through 4 provide a flow chart that describes a method of repairing superalloy components, according to the present disclosure, including schematic illustrations of a superalloy component in various process steps; and FIG. 5 illustrates a graph of a phase agglomeration cycle, which is part of the present method.

DETAILED DESCRIPTION

Figure 4:
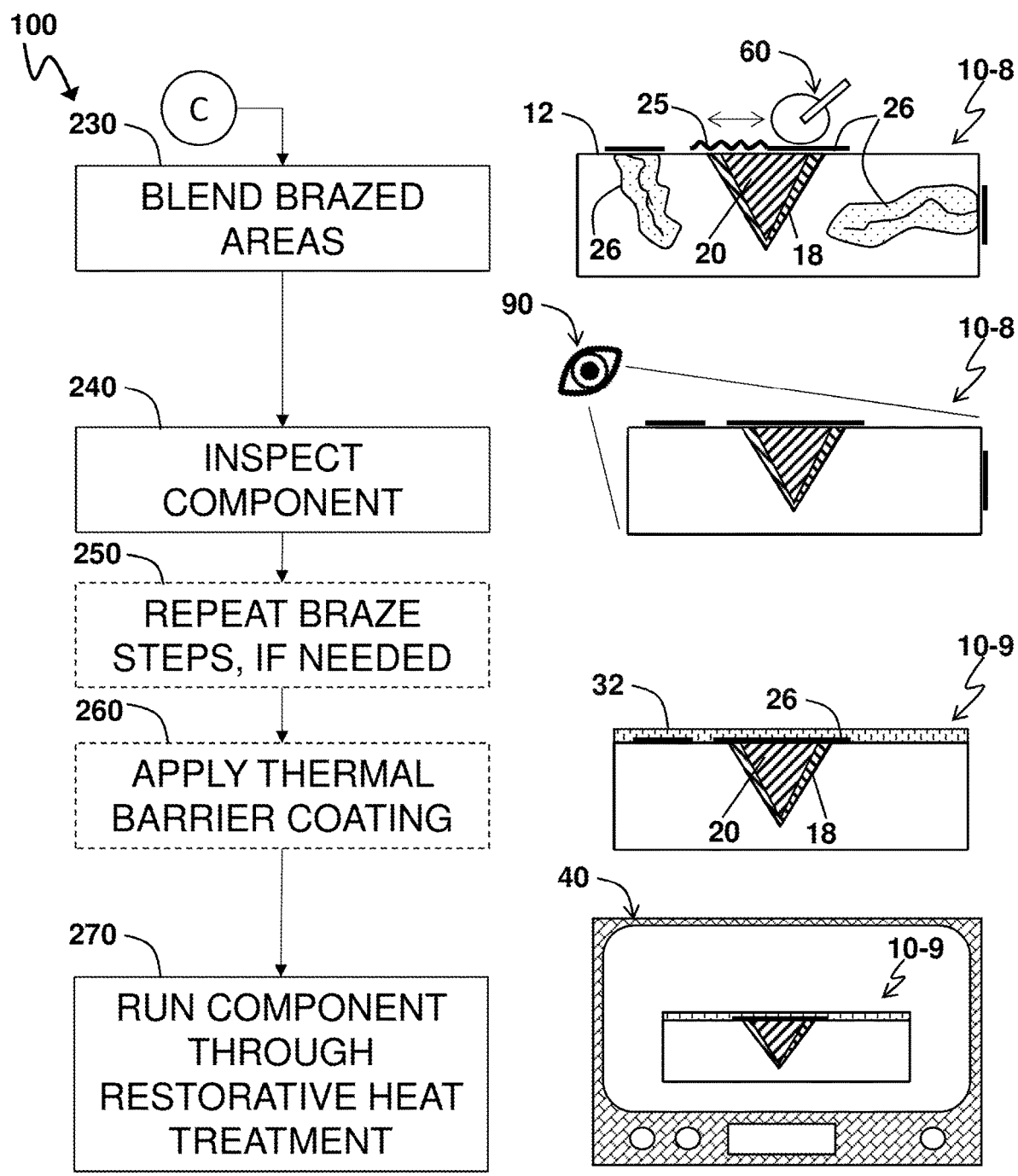

One or more specific aspects/embodiments of the present method will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present method are not intended to be interpreted as excluding the existence of additional embodiments or aspects that also incorporate the recited features.

The present disclosure is directed to a method of repairing components made of superalloy materials and, more particularly, to those components made of high gamma prime superalloys. Examples of such high gamma prime superalloys include, but are not limited to, B-1900, GTD-111, Inconel 100, Inconel 713, Inconel 792, MAR-M-246, MAR-M-509, Rene 77, Rene 125, U-500, CMSX single crystal alloys, and those shown in TABLE 1 below. All values in TABLE 1 are weight percent (wt. %). The term "Bal" represents the balance (remaining wt. %) of the composition.

TABLE 1

Exemplary High Gamma Prime Superalloy Compositions (by wt. %)

| | Al | B | C | Co | Cr | Hf | Mo | N | Nb | Ta | Ti | W | Zr |
|---|---|---|---|---|---|---|---|---|---|---|---|---|---|
| GTD444 | 4.23 | | 0.1 | 7.5 | 0.75 | | 1.5 | Bal | | 4.8 | 3.6 | 6 | |
| MAR-M-247 | 4.3 | 0.015 | 0.15 | 9.5 | 15.5 | | 2 | Bal | 2 | | 1.8 | 3.8 | 0.05 |
| Inconel 738 | 3.5 | 0.01 | 0.09-0.17 | 8.5 | 16 | | 1.7 | Bal | 0.8 | 1.7 | 3.5 | 2.5 | 0.05-0.1 |
| Inconel 939 | 1.9 | 0.01 | 0.15 | 19 | 22.4 | | | Bal | 1 | 1.4 | 3.7 | 1.6 | 0.1 |
| Rene 80 | 3 | 0.015 | 0.16 | 9.5 | 14 | | 4 | Bal | | | 5 | 4 | 0.03 |
| Rene 108 | 5.6 | 0.015 | 0.07 | 9 | 8 | 1.4 | 0.5 | Bal | | 3.2 | 0.7 | | 0.01 |
| Udimet 700 | 4.4 | 0.025 | 0.07 | 18.5 | 15 | | 5 | Bal | | | 3.5 | | |

FIGS. 1 through 4 schematically illustrate a high gamma prime superalloy component 10. The component 10 may be a turbomachine airfoil (e.g., a rotating blade or a stationary nozzle) or another part (e.g., a turbine shroud), which is comprised of a high gamma prime superalloy. The superalloy may be formed of a conventionally cast (CC), directionally solidified (DS), or single crystal (SX) material.

Turning now to FIG. 1, the method 100 begins with step 110 in which the component 10 is received and inspected. The inspection may occur visually or using equipment that scans the component 10. As illustrated, the component 10 includes a crack or defect 15 that projects inwardly from a surface 12. The crack 15 may be a straight crack or may be characterized by a complex shape (e.g., branched). In some instances (not illustrated), the crack 15 may extend all the way through the component 10.

In step 120, the component 10 is machined to create a machined component 10-1. The machining step 120 prepares the surface 12 for repair, for example, by smoothing the crack 15 and creating bonding surfaces 16.

In step 130, the machined component 10-1 is subjected to a phase agglomeration cycle (shown in FIG. 5), which occurs in a temperature-controlled furnace 40. The phase agglomeration cycle of step 130 involves heating the machined component 10-1 to a prescribed temperature and then cooling the heated component at a slow and controlled rate (e.g., from 0.5 degrees F. per minute to about 5 degrees F. per minute). The phase agglomeration cycle of step 130 causes phase agglomeration of different microstructures or crystal matrices that may exist within the machined component 10-1 and forms a smooth surface receptive to welding.

In step 140, the phase agglomerated component 10-2 is ready to receive welding material 20. Before applying the welding material 20, a base layer 18 (also known as a "butter pass") may optionally be applied to the bonding surfaces 16. The welding material 20 may have the same superalloy composition as the phase agglomerated component 10-2 or may have a different composition, which is another high gamma prime superalloy.

The welding material 20 may be a filler material, which is applied in layers to fill the void of the crack 15 (FIG. 1). For instance, the welding material 20 may be a weld wire, which is welded with a modulated pulsing laser source. The crack 15 is repeatedly welded and filled with weld filler until the crack 15 is filled to the desired amount.

Alternately, the welding material 20 may be a coupon that is sized and shaped to fit in the void shape. When a coupon is used, the coupon may be tack-welded and then welded into position.

Because high gamma prime superalloys (such as Rene 108) are prone to micro-cracking, the welding step 140 is preferably accomplished in an inert environment (e.g., a bath of argon gas) to prevent the micro-cracks from oxidizing. The welded component 10-2 remains in the inert environment until the component 10-2 reaches ambient temperature.

Turning now to FIG. 2, in step 150, a braze material 25 is applied over the welding material 20. High temperature brazing has been successfully implemented in the gas turbine industry to repair superalloy components in high loaded areas and even in critical components such as rotating parts. Brazing yields joints characterized by high temperature strength, excellent creep, excellent low cycle fatigue properties, and oxidation resistance on the repaired locations.

The braze material 25 may be applied over the welded areas 20 using a granular braze material, a paste-like braze material, a flexible braze tape, or, in some instances, a rigid braze preform. The braze material 25 may have the same or different mechanical properties as the base material (i.e., the superalloy composition) of the component 10. Typically, the braze material is a nickel-based brazing alloy, which may be used alone, or which may be blended with a powder of a superalloy, such as those discussed above. The brazing alloy may be mixed with binders (e.g., between 8% and 12%) and then applied on the top of the As shown schematically, the braze material 25 is applied to the surface 12 of the welded component 10-2 to completely cover the welding material 20, thereby creating the brazed component 10-3.

In step 160, the brazed component 10-3 is subjected to a heat treatment known as a braze cycle, which occurs in a high vacuum furnace 40. The position of the parts within the furnace 40 depends on the cracks' orientation, and generally the parts are positioned in the way that the weight force, combined with the capillary force, facilitates the flow of the brazing alloy in most of the cracks to be brazed. During the braze cycle, the braze material 25 flows into any gaps or voids around the welded material 20. The braze material 25 may also flow into any micro-cracks that develop near the welded material 20 during the braze cycle. The braze cycle may occur in the same furnace 40 as is used for the phase agglomeration cycle, although the heating and cooling profiles are substantially different. Namely, the heating during the braze cycle occurs at a lower temperature and over a shorter duration than the phase agglomeration cycle. Also, the cool-down rate is substantially shorter.

In an exemplary (and non-limiting) braze cycle, the furnace 40 will be slowly heated up to a temperature range of about 200° C. to about 400° C. During this first heating phase, the binder gradually evaporates and leads to a slight shrinkage of the brazing material 25. After this short dwell time meant to eliminate most of the binder, the temperature continues to gradually increase. After reaching a sufficiently high temperature to completely melt the brazing alloy and homogenize the mixture of powder, the temperature will be lowered to an intermediate temperature between the liquidus and the solidus temperature. During a long dwell time (e.g., >3 hours) at the intermediate temperature, the front of the liquid phases will be slowly shifted due to the diffusion of melting point depressant elements into the base metal. The described mechanism is generally defined as diffusion brazing or transient liquid phase brazing (TLP brazing).

Step 170 represents the optional step of subjecting the heat-treated brazed component 10-3 to a hot isostatic pressure (HIP) cycle. The HIP cycle, occurs in a pressurized vessel 50, creates a high-temperature, high-pressure environment for the brazed component 10-3, which closes any small internal cracks within the brazed component 10-3, as may have occurred during the braze cycle of step 160.

In step 180, the brazed component 10-3 (or the optionally HIP-treated component 10-4) is subjected to a blending or recontouring step to restore the desired geometry of the component surface. Normally, because the brazing composition may include a binder that evaporates during the braze cycle, a generous amount of brazing composition is deposited over the weld material 20 (or any subsequent cracks). A blending tool 60 is used to smooth the excess braze material 25 and create a blended surface 26. The blending tool 60 may be manually operated (e.g., a hand grinder), or the blending tool 60 may be part of a machining apparatus.

Continuing to FIG. 3, in step 190, the blended component 10-5 is cleaned by immersing the blended component 10-5 in a salt bath 70. The salt bath 70 removes tenacious and thermodynamically stable oxidation and, to some extent, corrosion products from cracks 15 and from the surface 12 of the component 10. Uncoated parts, which also have been subjected to strong thermo-mechanical fatigue (TMF) degradation and erosion impact, may also need a salt bath to remove the resulting contamination scales. The salt bath reduces the thickness of the oxide surface scales by 70% to 90% and removes inner oxidation products from cooling holes and cavities. Contaminants (such as oil, grease, etc.) can also be dissolved.

Salt bath cleaning is carried out in a discontinuous process in which the components 10 are charged in chemically resistant baskets and immersed for a predetermined time in the molten salt bath 70. Salt baths 70 for metal oxide removal may be primarily composed of sodium hydroxide and differing amounts of strongly oxidizing agents, such as sodium nitrate. Some catalysts may be added to the salt bath 70 to accelerate and control the oxidizing properties of the salt bath. Additional compounds may also be added to protect the base metal from undesired chemical attack.

The salt bath 70 is preferred to have the lowest possible viscosity during the entire exposure time of the component 10, so that the molten salt is able to penetrate cracks and internal cavities. The salt bath 70 used for metal oxide removal may operate in a temperature range of about 400° C. to about 500° C. In the case of Rene 108, the salt bath 70 is highly desired, since the cracks are deeply oxidized and the successive optional cleaning step 200, the so-called "fluoride ion cleaning" (FIC), alone would not be sufficient to remove all oxides.

An optional second cleaning step 200 employs dynamic sub-atmospheric fluoride ion cleaning (FIC), which is a highly effective process for the removal of deeply embedded oxides from superalloys containing significant amounts of aluminum and titanium. The cleaning effect is based on chemical reactions, such as the conversion of thermodynamically highly stable metal oxides in reducible fluorides as well as the formation of volatile metal fluorides. These reactions take place in a reactor 80, which is heated to a temperature range of from about 900° C. to about 1200° C., with pressures between about 50 Torr and about 765 Torr.

Gases (e.g., Argon (Ar), hydrogen ($H_2$), and/or hydrogen fluoride (HF)) are injected in sequence to allow a reaction and reduction of the metal oxides. Finally, the extraction of the gaseous reaction products is obtained by evacuating the system. The evacuation step is important since the described chemical reactions represent dynamic equilibria. It means that they reach the product side to some extent and are easily reversed if the chemical reaction products (metal fluorides and water) are not removed continuously during the process cycle. The cracks must be supplied with fresh reaction gases through intermediate evacuation steps of the reactor volume.

The FIC step 200 includes a sequence of cleaning cycles, which is tailored according to the specific alloy, the degree of damage, and the component. Excessive material attack, especially in terms of aluminum, titanium, and yttrium depletion, as well as attack of sensitive areas and brazed joints, must be avoided, since it could lead to a reduction of the mechanical properties or oxidation resistance of the base metal.

On the other hand, the wetting behavior of the braze alloy (as used in step 210) is improved by the depletion of the cleaned surface (since easily oxidizable elements, like titanium, can prevent wetting). In the specific case of Rene 108, cleaning is very challenging since the cracks may be relatively long (typically >4 mm) and/or may be strongly oxidized. The flow time of HF gas is strongly related to the length of the cracks and, for this reason, a specific long FIC process is applied to components 10 made of Rene 108 to be able to thoroughly clean any cracks in the salt bath-cleaned component 10-6.

The effectiveness of the FIC process is assessed by investigating characteristic metallurgical criteria: mainly the depth of the material attack and the oxide removal from the cracks. Oxide scales should be completely removed from crack surfaces and from wide accessible cracks. In extremely fine cracks, difficult to be accessed by the process gas, a certain amount of local residual oxides can be tolerated. Grain boundaries carbide attack and generally IGA can occur and is tolerated according to threshold values defined for the specific cases. The FIC process is considered one of the most reliable methods to remove oxides from cracked material, even in case of very fine thermomechanical fatigue cracks. For this reason, combined with a suitable brazing process, it can be used to repair even highly loaded areas of components.

In step 210, the braze process is repeated to seal any cracks 30 that may have resulted from the previous processes. An additional braze layer 25 is applied over the welded area 20. The resulting component 10-7 is subjected to another braze cycle 220, using the vacuum furnace 40. The braze cycle 220 may be of similar duration to that described in step 160.

Turning now to FIG. 4, the heat-treated component 10-8 is subjected to a blending step 230. In a manner similar to that described in step 180, the blending tool 60 is used to smooth the braze material 25 and create blended surfaces 26. The blending tool 60 may be manually operated, or its operation may be automated, for example, by using a robot arm to operate the blending tool 60.

In step 240, a non-destructive test (NDT) is performed on the component 10-8. One suitable NDT inspection method for defects detection is fluorescent penetrant inspection (FPI), although other inspection techniques may be used. Using an inspection tool 90 (such as a camera or ultraviolet light), an inspector carefully examines all surfaces in question and assesses the detected defects according to the predetermined standards. Areas in question may be marked so that location of indications can be identified easily for further analysis or repair.

If new cracks are identified during the inspection step 240, the component 10-8 may be brazed again (step 250). The brazing process includes the application of the braze material to the affected areas (as in step 210), the heating of the brazed component in a thermal cycle (as in step 220), and the blending of the brazed areas using a blending tool 60 (as in step 230).

A subsequent inspection step (not shown separately) may be conducted to ensure that any cracks in the component 10-8 are fully repaired.

Optionally, in step 260, a thermal barrier coating 32 may be applied to the surface 12 of the component 10-8 to create a coated component 10-9. The thermal barrier coating 32 may be useful in extending the life of the component in the high-temperature, harsh environments of a gas turbine.

In step 270, the component 10-9 (or alternately, the component 10-8) is subjected to a restorative heat treatment cycle, using the vacuum furnace 40 used previously. The restorative heat treatment cycle includes a heat ramp-up (in which the phase distribution is made as homogeneous as possible) and a cool-down period (in which the gamma prime particles are reprecipitated).

The heat ramp-up occurs by heating the component 10-9 in a vacuum, in which the temperature is raised as quickly as possible to a first predetermined temperature that is from 90% to 95% of the solution temperature (i.e., T5) of the superalloy. The component is maintained at the first predetermined temperature for a first defined period of time (e.g., from between 2 hours to 3 hours, ±15 minutes). A first cool-down period, using an inert gas fan, drops the temperature of the component 10-9 to between 900° F. and 1200° F. The component 10-9 is cooled at a rate of at least 30° F./minute.

The first cool-down period is followed by a second heating period, in which the temperature within the vacuum is raised as quickly as possible to a second predetermined temperature that is between 70% and 75% of the solution temperature of the superalloy. The component 10-9 is maintained at the second predetermined temperature for a second defined period of time (e.g., from between 4 hours to 5 hours, ±15 minutes). A second cool-down period, using an inert gas fan, drops the temperature of the component 10-9 to 1000° F. (±100° F.) at a cooling rate of at least 25° F./minute. The component 10-9 is subsequently allowed to cool to ambient at any convenient rate.

During the restorative heat treatment cycle 270, the microcrystalline structure of the component 10-9 is restored to a state similar (but not exactly identical) to that of the component 10-1, pre-processing. Specifically, the precipitated gamma prime particles (e.g., Ni-Al or Ni-Ti) may have a different size and/or a different distribution, as compared with the in-coming component 10-1. In the component 10-9, which has been subjected to the phase agglomeration cycle 130 and the restorative heat treatment cycle 270, the concentration of gamma prime particles and carbide compounds in the bulk material of the component 10-9 may be greater than in a corresponding component not subjected to these cycles 130, 270. The restorative heat treatment cycle 270 returns the mechanical properties of the component 10-9, thereby making the component 10-9 a serviceable component for use (e.g., in a gas turbine).

FIG. 5 illustrates a chart of an exemplary phase agglomeration cycle, as described in step 130 of the flow chart 100.

The chart is not necessarily to scale. The component 10 is heated at a ramp rate 310 over a first time "t1" to reach a temperature T2. The component 10 is maintained at temperature T2 for a short, predetermined period (e.g., less than 5 minutes) until time "t2", as represented by a plateau 320 in the phase agglomeration cycle curve 130. A second heat ramp 330 occurs between time "t2" and time "t3," during which period the temperature increases from temperature T2 to temperature T4. In one embodiment, temperature T4 is more than twice temperature T2 (e.g., about 225% of temperature T2). The temperature T4 is maintained for a relatively short, predetermined period (e.g., less than one hour) until time "t4", as represented by a plateau 340 in the phase agglomeration cycle curve 130.

A third heat ramp 350 occurs between time "t4" and time "t5," during which period the temperature increases from temperature T4 to temperature T5. The temperature T5 is the solution temperature of the superalloy, which is about 115% of temperature T4 and is from about 250% to about 270% of the temperature T2. The temperature T5 is maintained for a relatively longer, predetermined period (e.g., from one to three hours) until time "t6," as represented by a plateau 360 in the phase agglomeration cycle curve 130.

In one embodiment, the ramp rates used in steps 310, 330, and 350 are the same, or approximately the same. An exemplary (and non-limiting) ramp rate may be on the order of about 15° F. per minute to about 30° F. per minute. In a particular embodiment, the ramp rate may be about 25° F. per min. Alternately, the ramp rates 310, 330, and 350 may occur at different rates.

After the plateau 360, a controlled cool-down 370 begins, during which the temperature moves from temperature T5 at time "t6" to temperature T3 at time "t7." This cool-down rate 370 agglomerates the different microstructures within the component 10, which helps to prepare the component 10 for subsequent processing (e.g., welding and brazing).

In an exemplary embodiment, temperature T3 is about 175% of temperature T2 and between 65% and 70% of temperature T5, and the cool-down rate 370 is from about 0.5° F. per minute to about 5° F. per minute. Thus, the time between time "t6" and time "t7" is measured in multiple hours (e.g., between 15 and 30 hours). In one exemplary embodiment, the cool-down rate 370 may be about 1° F. per minute. In another exemplary embodiment, the cool-down rate 370 may be about 3° F. per minute. In some embodiments, the cool-down rate 370 may be about 5° F. per minute.

Optionally, the component 10 may be held at temperature T3 for a short, predetermined period (e.g., less than 5 minutes), the hold step not being separately illustrated. A gas fan quench period from time "t7" to time "t8" follows the curve 380. During this forced cooling period, the temperature drops from temperature T3 to temperature T1, which is less than 25% of temperature T2 and less than 10% of temperature T5. The final cooling of the component may occur at a rate defined by curve 390, thus allowing the component 10 to reach ambient temperature.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of repairing a superalloy component, the method comprising the following sequential steps:
   (a) subjecting the superalloy component to a phase agglomeration cycle, the superalloy component comprising at least one repair area;
   (b) applying weld material to the at least one repair area to create a weld surface;
   (c) covering the weld surface with brazing material;
   (d) subjecting the superalloy component to a braze cycle to produce a brazed component;
   (e) cleaning the brazed component; and
   (f) subjecting the cleaned component to a restorative heat treatment;
   wherein step (a) includes heating the superalloy component to a first prescribed temperature, using a uniform ramp rate and one or more periods of holding the superalloy component at a plateau temperature; allowing the superalloy component to cool down at a prescribed cool-down rate to a second prescribed temperature; and performing forced cooling of the superalloy component to a third prescribed temperature;
   wherein the step of heating the superalloy component comprises holding the superalloy component at the first prescribed temperature for a first prescribed period; and
   wherein the step of heating the superalloy component to a first prescribed temperature comprises heating to a first plateau temperature, holding for a second prescribed period, heating to a second plateau temperature greater than the first plateau temperature, and holding for a third prescribed period longer than the second prescribed period and shorter than the first prescribed period; wherein the second plateau temperature is about 85% of the first prescribed temperature.

2. The method of claim 1, wherein the superalloy component is comprised of a high gamma prime superalloy.

3. The method of claim 2, wherein the high gamma prime superalloy comprises at least one of: B-1900, GTD-111, Inconel 100, Inconel 713, Inconel 738, Inconel 792, Inconel 939, MAR-M-246, MAR-M-509, Rene 77, Rene 108, Rene 125, U-500, CM 247, or Mar M 247.

4. The method of claim 1, wherein the prescribed cool-down rate is between about 0.5° F. per minute and about 5° F. per minute.

5. The method of claim 1, wherein the second prescribed temperature is between 65% and 70% of the first prescribed temperature; and wherein the third prescribed temperature is less than 10% of the first prescribed temperature.

6. The method of claim 1, wherein step (a) further includes, after the forced cooling step, allowing the superalloy component to cool to ambient temperature.

7. The method of claim 1, further comprising, prior to step (a), machining the at least one repair area to produce at least one surface on which the weld material is applied.

8. The method of claim 7, further comprising, prior to step (b), applying a base layer of weld material to the at least one surface that has been machined.

9. The method of claim 1, wherein step (b) occurs in an inert environment.

10. The method of claim 1, wherein step (b) comprises welding a coupon of material into the at least one repair area.

11. The method of claim 1, further comprising, after step (d), subjecting the brazed component to a hot isostatic pressure cycle in a vacuum furnace.

12. The method of claim 1, further comprising, after step (d), blending the brazed areas to produce a smooth surface of the brazed component.

13. The method of claim 1, wherein step (e) further comprises immersing the brazed component in a salt bath.

14. The method of claim 13, wherein step (e) further comprises cleaning the brazed component with a fluoride ion cleaning process after immersing the brazed component in a salt bath.

15. The method of claim 1, further comprising, after step (e), applying additional brazing material to the weld material and to any visible cracks; subjecting the brazed component with the additional brazing material to the braze cycle; and blending the brazed areas.

16. The method of claim 1, further comprising, prior to step (f), performing a non-destructive inspection of the brazed component.

17. The method of claim 1, further comprising, prior to step (f), applying a thermal barrier coating to the surface of the brazed component.

* * * * *